(12) United States Patent
Miles

(10) Patent No.: US 7,723,015 B2
(45) Date of Patent: *May 25, 2010

(54) METHOD FOR MANUFACTURING AN ARRAY OF INTERFEROMETERIC MODULATORS

(75) Inventor: Mark W. Miles, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/832,471

(22) Filed: Aug. 1, 2007

(65) Prior Publication Data

US 2007/0269748 A1  Nov. 22, 2007

Related U.S. Application Data

(62) Division of application No. 10/414,594, filed on Apr. 15, 2003, now Pat. No. 7,297,471.

(51) Int. Cl.
G03F 7/26 (2006.01)
(52) U.S. Cl. .................................... 430/313; 430/316
(58) Field of Classification Search ................ 430/311, 430/313, 316
See application file for complete search history.

(56) References Cited

U.S. PATENT DOCUMENTS

| | | | |
|---|---|---|---|
| 4,500,171 A | 2/1985 | Penz et al. |
| 4,519,676 A | 5/1985 | te Velde |
| 4,566,935 A | 1/1986 | Hornbeck |
| 4,710,732 A | 12/1987 | Hornbeck |
| 4,859,060 A | 8/1989 | Katagiri et al. |
| 4,900,395 A | 2/1990 | Syverson et al. |
| 4,954,789 A | 9/1990 | Sampsell |
| 4,956,619 A | 9/1990 | Hornbeck |
| 5,034,351 A | 7/1991 | Sun et al. |
| 5,083,857 A | 1/1992 | Hornbeck |
| 5,099,353 A | 3/1992 | Hornbeck |
| 5,124,834 A | 6/1992 | Cusano et al. |
| 5,216,537 A | 6/1993 | Hornbeck |
| 5,231,532 A | 7/1993 | Magel et al. |
| 5,233,456 A | 8/1993 | Nelson |
| 5,287,215 A | 2/1994 | Warde et al. |
| 5,293,272 A | 3/1994 | Jannson et al. |
| 5,324,683 A | 6/1994 | Fitch et al. |
| 5,345,328 A | 9/1994 | Fritz et al. |
| 5,454,906 A | 10/1995 | Baker et al. |
| 5,485,304 A | 1/1996 | Kaeriyama |
| 5,497,262 A | 3/1996 | Kaeriayama |
| 5,526,172 A | 6/1996 | Kanack |
| 5,526,951 A | 6/1996 | Bailey |
| 5,583,688 A | 12/1996 | Hornbeck |
| 5,600,383 A | 2/1997 | Hornbeck |
| 5,606,441 A | 2/1997 | Florence et al. |
| 5,631,782 A | 5/1997 | Smith et al. |
| 5,646,768 A | 7/1997 | Kaeiyama |
| 5,650,881 A | 7/1997 | Hornbeck |
| 5,673,139 A | 9/1997 | Johnson |
| 5,726,480 A | 3/1998 | Pister |
| 5,745,281 A | 4/1998 | Yi et al. |
| 5,751,469 A | 5/1998 | Arney et al. |
| 5,783,864 A | 7/1998 | Dawson et al. |
| 5,784,212 A | 7/1998 | Hornbeck |
| 5,808,781 A | 9/1998 | Arney et al. |
| 5,822,110 A | 10/1998 | Dabbaj |
| 5,825,528 A | 10/1998 | Goossen |
| 5,835,255 A | 11/1998 | Miles |

(Continued)

FOREIGN PATENT DOCUMENTS

DE  199 38 072  3/2000

(Continued)

OTHER PUBLICATIONS

Wang et al., Flexible curcuit-based RF MEMS Switches, Proceedings of 2001 ASME International Mechanical Engineering Congress and Exposition, pp. 1-6, 2001.

(Continued)

*Primary Examiner*—Kathleen Duda
(74) *Attorney, Agent, or Firm*—Knobbe, Martens, Olson, & Bear LLP

(57) ABSTRACT

In one embodiment, the invention provides a method for manufacturing an array of interferometric modulators. Each interferometric modulator comprises first and second optical layers which when the interferometric modulator is in an undriven state are spaced by a gap of one size, and when the interferometric modulator is in a driven state are spaced by a gap of another size, the size of the gap determining an optical response of the interferometric modulator. The method comprises fabricating interferometric modulators of a first type characterized by the size of the gap between its first and second optical layers when in the undriven state; fabricating interferometric modulators of a second type characterized by the size of the gap between its first and second optical layers when in the undriven state; and fabricating modulators of a third type characterized by the size of the gap between its first and second optical layers when in the undriven state, wherein fabricating the interferometric modulators of the first, second, and third types comprises using a sequence of deposition and patterning steps of not more than 9 masking steps to deposit and pattern layers of material on a substrate.

16 Claims, 20 Drawing Sheets

U.S. PATENT DOCUMENTS

| | | | |
|---|---|---|---|
| 5,838,484 | A | 11/1998 | Goossen et al. |
| 5,867,302 | A | 2/1999 | Fleming |
| 5,896,796 | A | 4/1999 | Chih |
| 5,914,803 | A | 6/1999 | Hwang et al. |
| 5,920,421 | A | 7/1999 | Choi |
| 5,967,163 | A | 10/1999 | Pan et al. |
| 5,986,796 | A | 11/1999 | Miles |
| 5,998,293 | A | 12/1999 | Dawson et al. |
| 6,031,653 | A | 2/2000 | Wang |
| 6,038,056 | A | 3/2000 | Florence et al. |
| 6,040,937 | A | 3/2000 | Miles |
| 6,100,477 | A | 8/2000 | Randall et al. |
| 6,165,890 | A | 12/2000 | Kohl et al. |
| 6,204,080 | B1 | 3/2001 | Hwang |
| 6,215,221 | B1 | 4/2001 | Cabuz et al. |
| 6,218,056 | B1 * | 4/2001 | Pinarbasi et al. ............... 430/5 |
| 6,284,560 | B1 | 9/2001 | Jech et al. |
| 6,288,472 | B1 | 9/2001 | Cabuz et al. |
| 6,297,072 | B1 | 10/2001 | Tilmans et al. |
| 6,358,021 | B1 | 3/2002 | Cabuz |
| 6,359,673 | B1 | 3/2002 | Stephenson |
| 6,377,233 | B2 | 4/2002 | Colgan et al. |
| 6,407,851 | B1 | 6/2002 | Islam et al. |
| 6,447,126 | B1 | 9/2002 | Hornbeck |
| 6,448,622 | B1 | 9/2002 | Franke et al. |
| 6,465,355 | B1 | 10/2002 | Horsley |
| 6,574,033 | B1 | 6/2003 | Chui et al. |
| 6,602,791 | B2 | 8/2003 | Ouellet et al. |
| 6,618,187 | B2 | 9/2003 | Pilossof |
| 6,632,698 | B2 | 10/2003 | Ives |
| 6,635,919 | B1 | 10/2003 | Melendez et al. |
| 6,650,455 | B2 | 11/2003 | Miles |
| 6,657,832 | B2 | 12/2003 | Williams et al. |
| 6,674,090 | B1 | 1/2004 | Chua et al. |
| 6,674,562 | B1 | 1/2004 | Miles |
| 6,677,225 | B1 | 1/2004 | Ellis et al. |
| 6,680,792 | B2 | 1/2004 | Miles |
| 6,713,235 | B1 | 3/2004 | Ide et al. |
| 6,720,267 | B1 | 4/2004 | Chen et al. |
| 6,747,800 | B1 | 6/2004 | Lin |
| 6,756,317 | B2 | 6/2004 | Sniegowski et al. |
| 6,782,166 | B1 | 8/2004 | Grote et al. |
| 6,788,175 | B1 | 9/2004 | Prophet et al. |
| 6,794,119 | B2 | 9/2004 | Miles |
| 6,806,110 | B2 | 10/2004 | Lester et al. |
| 6,812,482 | B2 | 11/2004 | Fleming et al. |
| 6,867,896 | B2 | 3/2005 | Miles |
| 6,953,702 | B2 | 10/2005 | Miller et al. |
| 6,999,236 | B2 | 2/2006 | Lin |
| 7,008,812 | B1 | 3/2006 | Carley |
| 7,027,202 | B1 | 4/2006 | Hunter et al. |
| 7,041,224 | B2 | 5/2006 | Patel et al. |
| 7,041,571 | B2 | 5/2006 | Strane |
| 7,049,164 | B2 | 5/2006 | Bruner |
| 7,110,158 | B2 | 9/2006 | Miles |
| 7,123,216 | B1 | 10/2006 | Miles |
| 7,172,915 | B2 | 2/2007 | Lin et al. |
| 7,250,315 | B2 | 7/2007 | Miles |
| 7,297,471 | B1 * | 11/2007 | Miles ...................... 430/321 |
| 7,321,457 | B2 | 1/2008 | Heald |
| 2001/0003487 | A1 | 6/2001 | Miles |
| 2001/0040675 | A1 | 11/2001 | True et al. |
| 2002/0003400 | A1 | 1/2002 | Lee |
| 2002/0014579 | A1 | 2/2002 | Dunfield |
| 2002/0021485 | A1 | 2/2002 | Pilossof |
| 2002/0054422 | A1 | 5/2002 | Carr et al. |
| 2002/0055253 | A1 | 5/2002 | Rudhard |
| 2002/0058422 | A1 | 5/2002 | Jang et al. |
| 2002/0071169 | A1 | 6/2002 | Bowers et al. |
| 2002/0086455 | A1 | 7/2002 | Franosch et al. |
| 2002/0110948 | A1 | 8/2002 | Huang et al. |
| 2002/0117728 | A1 | 8/2002 | Brosnihan et al. |
| 2002/0146200 | A1 | 10/2002 | Kudric et al. |
| 2002/0186483 | A1 | 12/2002 | Hagelin et al. |
| 2002/0197761 | A1 * | 12/2002 | Patel et al. ..................... 438/52 |
| 2003/0006468 | A1 | 1/2003 | Ma et al. |
| 2003/0016428 | A1 | 1/2003 | Kato et al. |
| 2003/0053078 | A1 | 3/2003 | Missey et al. |
| 2003/0053233 | A1 | 3/2003 | Felton |
| 2003/0072070 | A1 | 4/2003 | Miles |
| 2003/0123126 | A1 | 7/2003 | Meyer et al. |
| 2003/0202264 | A1 | 10/2003 | Weber et al. |
| 2003/0202265 | A1 | 10/2003 | Reboa et al. |
| 2003/0210851 | A1 | 11/2003 | Fu et al. |
| 2003/0231373 | A1 | 12/2003 | Kowarz et al. |
| 2004/0027671 | A1 | 2/2004 | Wu et al. |
| 2004/0035821 | A1 | 2/2004 | Doan et al. |
| 2004/0051929 | A1 | 3/2004 | Sampsell et al. |
| 2004/0053434 | A1 | 3/2004 | Bruner |
| 2004/0100680 | A1 | 5/2004 | Huibers et al. |
| 2004/0124483 | A1 | 7/2004 | Partridge et al. |
| 2004/0124495 | A1 | 7/2004 | Chen et al. |
| 2004/0125347 | A1 | 7/2004 | Patel et al. |
| 2004/0136045 | A1 | 7/2004 | Tran |
| 2004/0150915 | A1 * | 8/2004 | Thomas et al. ........... 360/235.8 |
| 2004/0191937 | A1 | 9/2004 | Patel et al. |
| 2004/0191946 | A1 | 9/2004 | Patel et al. |
| 2004/0240032 | A1 * | 12/2004 | Miles ........................ 359/291 |
| 2005/0024557 | A1 | 2/2005 | Lin |
| 2005/0250235 | A1 * | 11/2005 | Miles et al. ................... 438/48 |
| 2006/0066935 | A1 | 3/2006 | Cummings et al. |
| 2008/0026328 | A1 | 1/2008 | Miles |
| 2008/0130089 | A1 | 6/2008 | Miles |

FOREIGN PATENT DOCUMENTS

| | | |
|---|---|---|
| EP | 0 069 226 | 1/1983 |
| EP | 0 035 299 | 9/1983 |
| EP | 0 695 959 | 2/1996 |
| EP | 0 788 005 | 8/1997 |
| EP | 1 209 738 | 5/2002 |
| EP | 1 275 997 | 1/2003 |
| JP | 49-004993 | 1/1974 |
| JP | 05275401 | 10/1993 |
| JP | 9-127439 | 5/1997 |
| JP | 10-020328 | 1/1998 |
| JP | 10148644 | 6/1998 |
| JP | 10-209176 | 8/1998 |
| JP | 11-097799 | 4/1999 |
| JP | 2001-085519 | 3/2001 |
| JP | 2002-0287047 | 3/2001 |
| JP | 2002-062490 | 2/2002 |
| JP | 2002-207182 | 7/2002 |
| JP | 2002-243937 | 8/2002 |
| JP | 2002-328313 | 11/2002 |
| JP | 2003-001598 | 1/2003 |
| WO | WO 91/005284 | 4/1991 |
| WO | WO 92/10925 | 6/1992 |
| WO | WO 01/014248 | 3/2001 |
| WO | WO 01/063657 | 8/2001 |
| WO | WO 02/024570 | 3/2002 |
| WO | WO 02/079853 | 10/2002 |
| WO | WO 03/014789 | 2/2003 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.

Fan et al., "Channel Drop Filters in Photonic Crystals," Optics Express, vol. 3, No. 1 (1998).

Ibbotson et al., "Comparison of XeF2 and F-atom reactions with Si and SiO2," Applied Physics Letters, vol. 44, No. 12, pp. 1129-1131 (Jun. 1984).

Raley et al., "A Fabry-Perot Microinterferometer for Visible Wavelengths," IEEE Solid-State Sensor and Actuator Workshop, Hilton Head, SC, pp. 170-173 (1992).

Sridharan et al. "Post-packaging Release a New Concept for Surface-Micromachined Devices" Technical Digest, IEEE Solid-State Sensor & Actuator Workshop, New York, NY US Nov. 8, 1998 pp. 225-228.

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Yao et al., BrF3 dry release technology for large freestanding parylene microstructures and electrostatic actuators, Sensors and Actuators A, vol. 97-98, pp. 771-775, Apr. 2002.

Office Action dated Sep. 22, 2006 in U.S. Appl. No. 10/414,594.

Office Action dated Aug. 11, 2005 in U.S. Appl. No. 10/414,594.

Dai et al., "A CMOS surface micromachined pressure sensor," Journal of the Chinese institute of Engineers, 1999, vol. 22, No. 3 (May), pp. 375-380.

Office Action dated May 22, 2008 in U.S. Appl. No. 11/939,746.

Office Action dated Nov. 28, 2008 in U.S. Appl. No. 11/939,746.

* cited by examiner

Step 1

Step 2

Step 3

Step 4

*Step 5*

*Step 6*

*Step 7*

Step 8

Step 9

Step 10

Step 11

Step 12

Step 13

Step 17

Step 18

*Step 1*

*Step 2*

*Step 3*

Step 5

Step 6

Step 7

Step 8

Step 9

Step 10

*Step 5*

*Step 6*

*Step 7*

Step 1

Step 2

Step 3

Step 4

Step 5

Step 6

Step 7

Step 8

Step 9

*Step 10*

*Step 11*

US 7,723,015 B2

METHOD FOR MANUFACTURING AN ARRAY OF INTERFEROMETERIC MODULATORS

CROSS-REFERENCE TO RELATED APPLICATION

This application is a divisional of and claims priority to U.S. patent application Ser. No. 10/414,594, filed Apr. 15, 2003, and published as U.S. patent application publication No. 2006/0261852 A1 on Nov. 23, 2006.The disclosure of the foregoing application is hereby incorporated by reference in its entirety.

BACKGROUND

1. Field

This invention relates generally to fabrication processes for interferometric modulator arrays and more specifically to methods for manufacturing an array of interferometric modulators.

2. Description of the Related Art

An interferometric modulator is a class of MEM (microelectromechanical) systems devices which have been described and documented in a variety of patents including U.S. Pat. Nos. 5,835,255, 5,986,796, 6,040,937, 6,055,090, 6,574,033 (application Ser. No. 10/084,893), U.S. Pat. No. 6,680,792 (application Ser. No. 09/974,544), U.S. Pat. No. 6,867,896 (application Ser. No. 09/966,843), and U.S. Pat. No. 7,067,846 (application Ser. No. 10/878,282), and U.S. Patent Application Publication No. 2003/0072070 (application Ser. No. 10/082,397), herein incorporated by reference. One of the key attributes of these devices is the fact that they are fabricated monolithically using semiconductor-like fabrication processes. Specifically, these devices are manufactured in a sequence of steps which combine film deposition, photolithography, and etching using a variety of techniques. Costs in manufacturing processes of this sort are driven in large part by the number of steps in the sequence. Thus, a reduction in the number of masking steps in the overall manufacturing process will help to reduce manufacturing costs.

DETAILED DESCRIPTION OF PREFERRED EMBODIMENTS

Figure 1A:
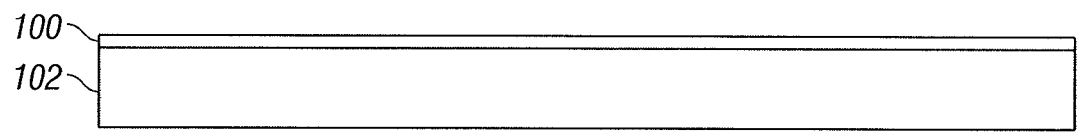
FIGS. 1A-1F illustrate a 9 mask step interferometric modulator fabrication process including a step for defining a black mask and steps for an additive sacrificial layer sub-process in accordance with one embodiment of the invention.
Figure 1A:
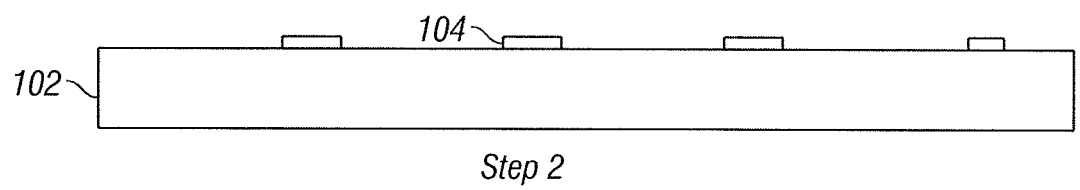
Figure 1A:
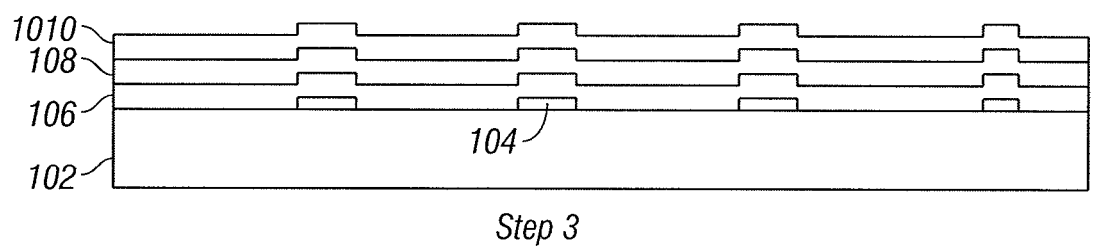
Figure 1A:
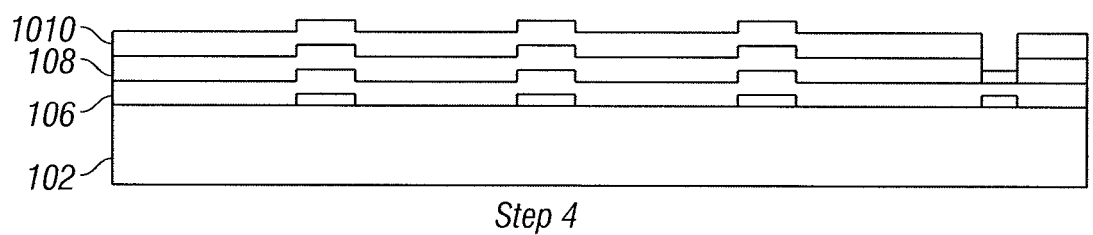

In the following detailed description of embodiments of the invention, numerous specific details are set forth such as examples of specific materials, machines, and methods in order to provide a thorough understanding of the present invention. It will be apparent, however, to one skilled in the art that these specific details need not be employed to practice the present invention. In other instances, well known materials, machines, or methods have not been described in detail in order to avoid unnecessarily obscuring the present invention.

U.S. Pat. No. 6,794,119 (application Ser. No. 10/074,562) herein incorporated by reference describes a prototypical fabrication sequence for building interferometric modulators. In general, interferometric modulator fabrication sequences and categories of sequences are notable for their simplicity and cost effectiveness. This is due in large part to the fact that all of the films are deposited using physical vapor deposition (PVD) techniques with sputtering being the preferred and least expensive of the approaches. The materials used are common throughout the liquid crystal display (LCD) industry. This is significant because this industry represents the most cost effective means for manufacturing large area arrays of devices and provides a prime infrastructure for use in building displays and other devices based on interferometric modulators or other MEM devices. This characteristic is described in U.S. Pat. No. 6,867,896 herein incorporated by reference. The materials may be etched using low-cost wet etching processes, or higher cost dry etching techniques depending on the demands of the display application and the need for dimensional control. Photolithography may be achieved using low-cost imaging tools or higher cost step and repeat machines, also dependent on the dimensional requirements of the application. The dimensional requirements are primarily dictated by the resolution of the display in display-centric applications.

FIGS. 1A-1F illustrate one embodiment of an interferometric modulator fabrication sequence which utilizes 9 masking steps. Step 1 shows the deposition of a stack of films 100 on a substrate 102. The stack 100 is used in the definition of a black mask. More detail on how a black mask may be incorporated into an interferometric modulator array is described in U.S. Pat. No. 6,741,377 (application Ser. No. 10/190,400) herein incorporated by reference. The stack 100 is nominally deposited by sputtering and is subsequently patterned in Step 2. Patterning refers to a class of techniques which usually include a lithographic step, a development step, and a material etch step. These are well known in the art and described in detail in the aforementioned patents and patent applications.

In Step 3, an insulator 106, an optical film 108, and a conductor 1010 are deposited also using sputtering and are of a thickness and composition which has been described in the aforementioned patents and patent applications. Examples of the insulator, optical film, and conductor include silicon dioxide, chrome, and aluminum respectively. The optical film 108 and the conductor 1010 have been subsequently patterned in Step 4.

For interferometric modulator matrices that are to be multicolor displays, some mechanism must be provided for depositing and patterning sacrificial layers with multiple heights. The height of the sacrificial layer is what determines one of the color modes or states of the interferometric modulator during operation. Typical full color displays require matrices capable of display in at least three colors, Red, Green, and Blue.

Figure 1B:
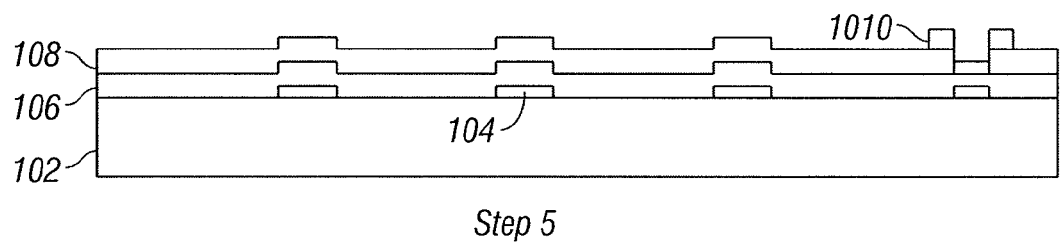
Figure 1B:
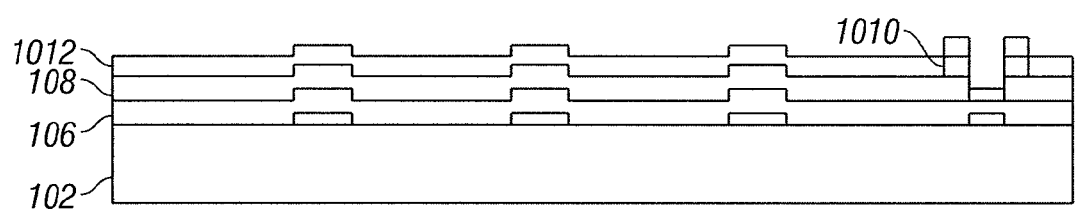
Figure 1B:
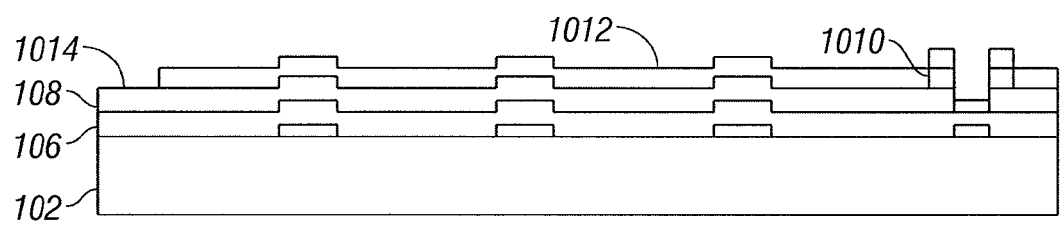

FIG. 1B begins with Step 5 where the conductor 1010 has been further patterned to form the conductor rails. These rails are used to enhance the conductivity of the underlying chrome and thereby improve the performance of the overall display by reducing R/C time constants. In Step 6, an insulating film or films 1012 has been deposited. Step 7 reveals where insulator films 1012 have been patterned to expose the optical film 108 as a lead 1014 for bonding at a later step.

Figure 1C:
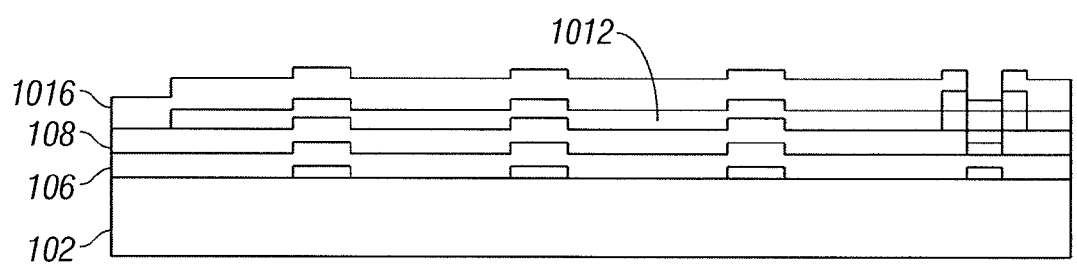
Figure 1C:
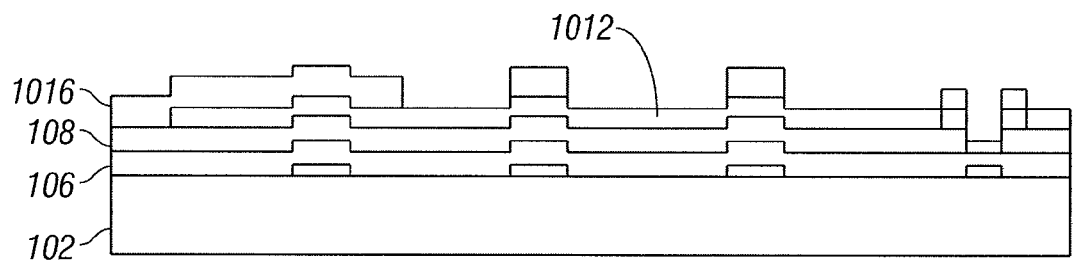
Figure 1C:
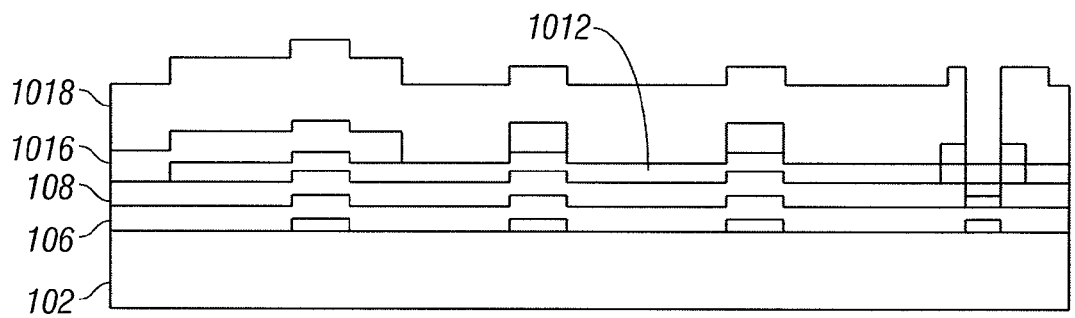

FIG. 1C reveals the deposition of a first sacrificial layer 1016 in Step 8 using sputtering and its subsequent patterning in Step 9. Step 10 shows the deposition of a second sacrificial layer 1018 also using sputtering.

Figure 1D:
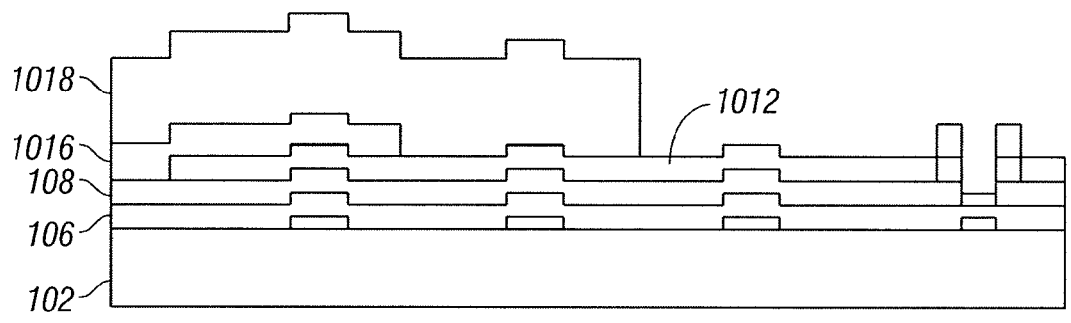
Figure 1D:
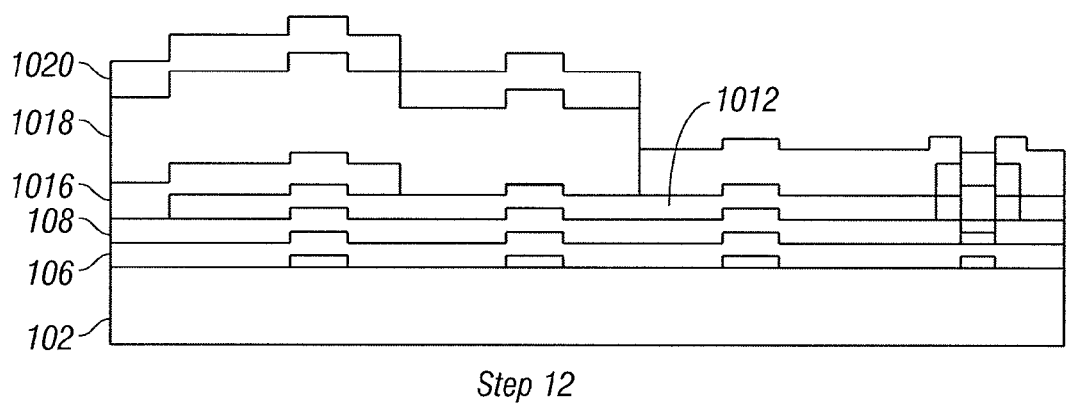
Figure 1D:
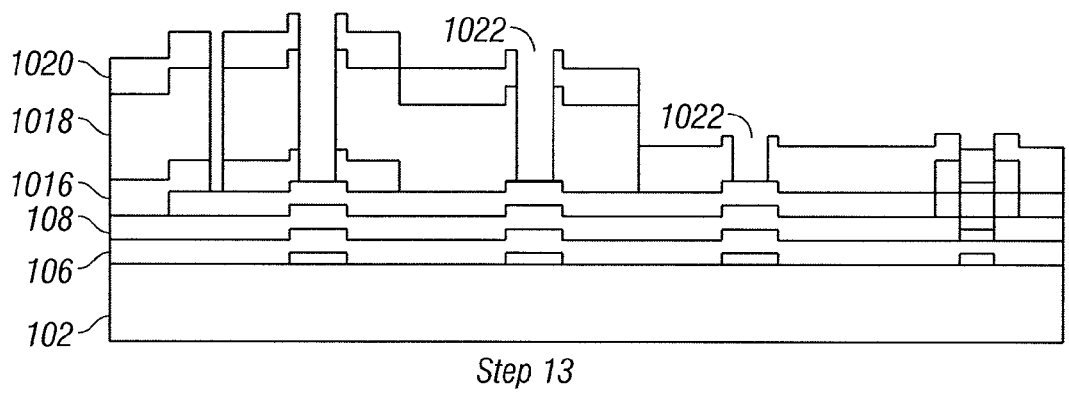

FIG. 1D begins in Step 11 with the patterning of sacrificial layer 1018 followed by the deposition of a third sacrificial layer 1020 in Step 12. In Step 13, an etch step is performed, the goal of which is to define support post vias 1022. This may be done using either wet or dry etching techniques as all of the previous etches may be accomplished.

Figure 1E:
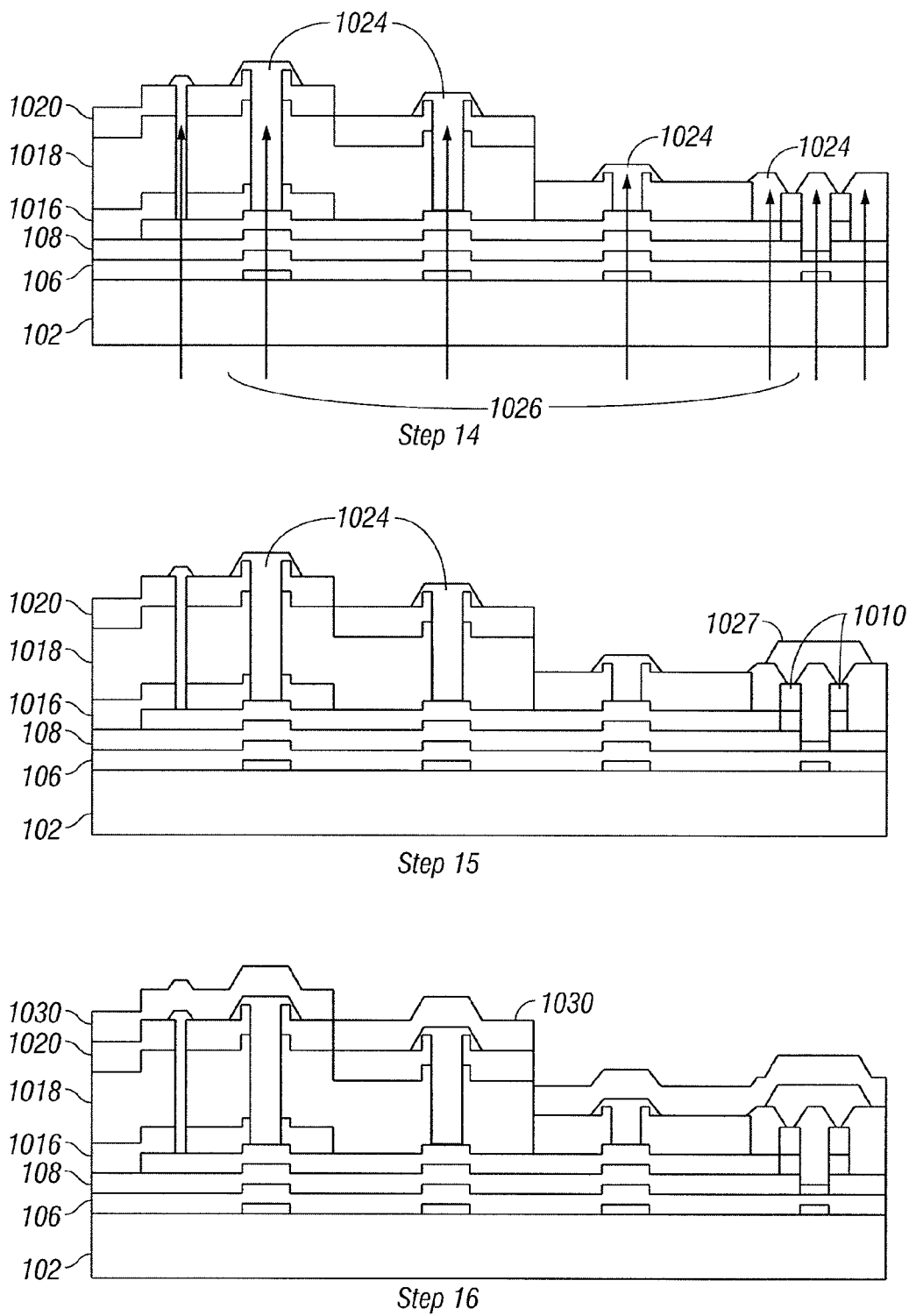

FIG. 1E reveals the definition of support posts 1024. More detail on how this process can be accomplished is contained in U.S. Pat. No. 6,794,119 herein incorporated by reference. In one embodiment, a negative acting photosensitive material is spun onto the structure and is exposed through the post support vias through the backside of the wafer illustrated by incident light arrows 1026. The post support vias are transparent to the light because the sacrificial layers are designed to be opaque. Thus the sacrificial layers act as a mask and save on an additional masking step. Step 14 shows support posts 1024 that are formed in each support post via 1022. The support posts 1024 may be polymeric, though they could be of any photo-definable material or material matrix. Step 15 shows the definition of a planar cover material 1027 which is used to smooth the topology presented by conductor rails 1010. This is accomplished using standard lithography. In Step 16 a mechanical film/s 1030 has been deposited.

Figure 1F:
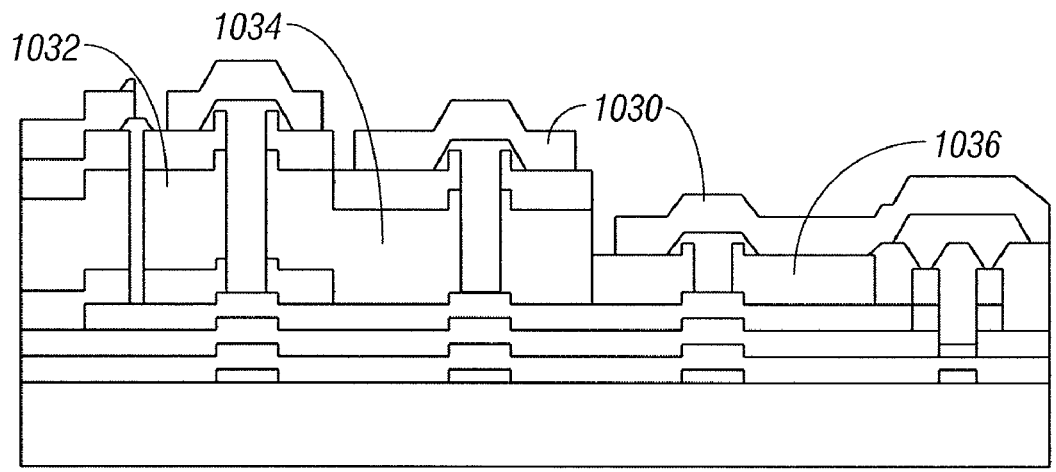
Figure 1F:
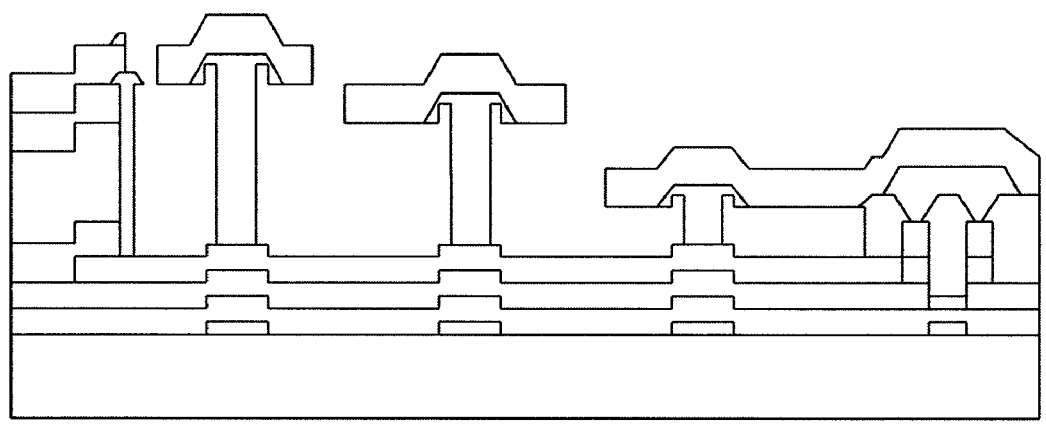

FIG. 1F begins with Step 17 where the mechanical layer 1030 has been patterned to form the interferometric modulator matrix Red, Green, and Blue columns which are distinguished by the different sacrificial layer heights, 1032, 1034, and 1036. Finally, in Step 18, the sacrificial layer has been removed using one of a variety of etching techniques. The preferred technique uses $XeF_2$ gas to spontaneously etch the sacrificial material. More detail on this approach can be found in U.S. Pat. No. 6,794,119 herein incorporated by reference.

Figure 2:
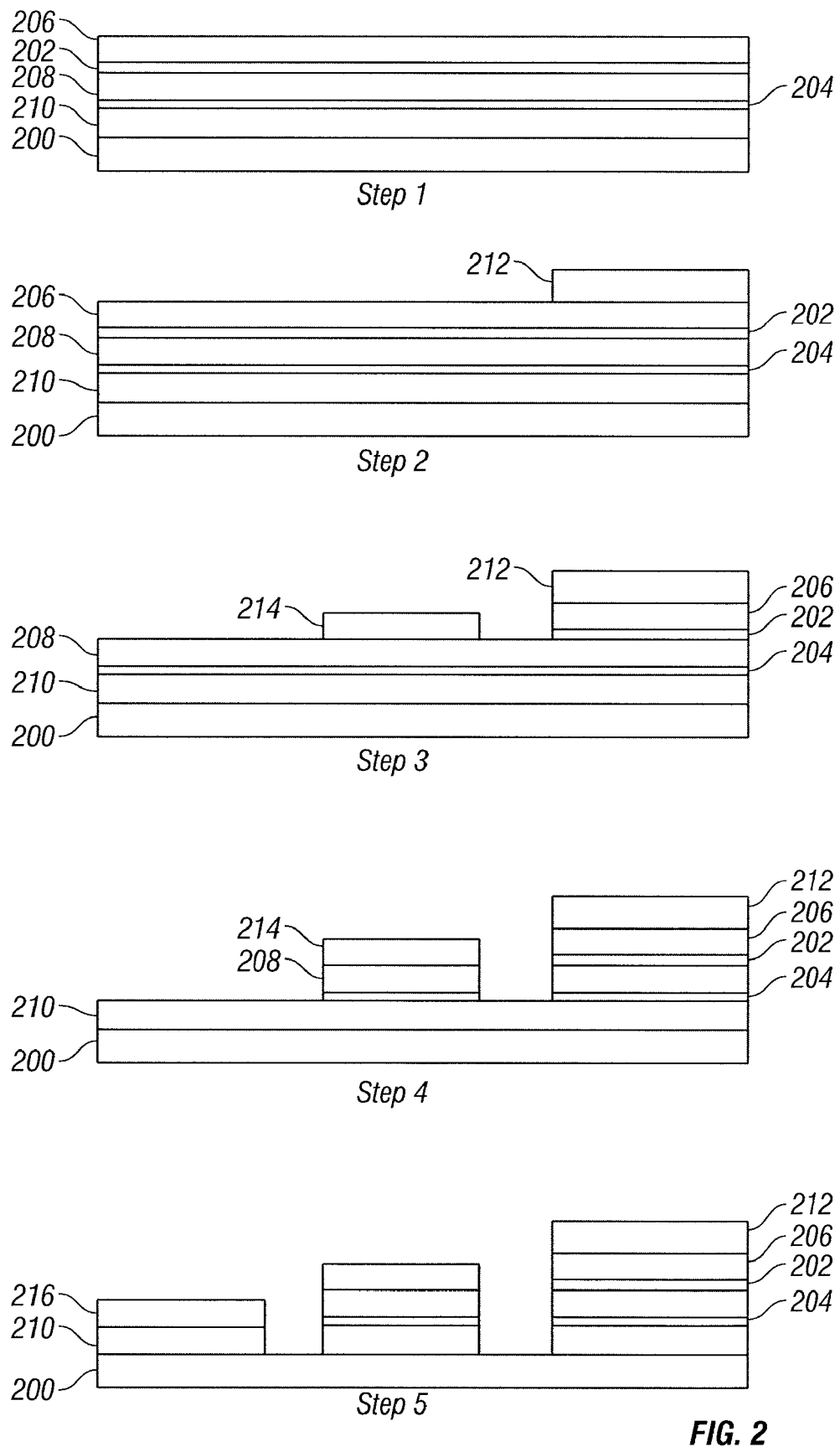
FIG. 2 illustrates a subtractive sacrificial layer sub-process in accordance with another embodiment of the invention.

Steps 8-12 of the previous sequence represent the sacrificial layer subprocess, i.e. the sequence of steps whereby the sacrificial layer heights are defined and patterned. This is an additive approach. FIG. 2 illustrates an alternative sacrificial layer sub-process that includes a subtractive approach. Referring to FIG. 2, substrate 200 is coated with a multilayer sacrificial stack which comprises two different materials which are both etchable using $XeF_2$, but which are wet etched, or potentially dry etched, using different chemistries. Silicon and molybdenum are two candidates, though there are others, for both these substances can be etched using $XeF_2$ However, silicon can be wet etched by hot solutions of tetramethylammonium hydroxide (among other etchants) while molybdenum can be etched using solutions of phosphoric, acetic, and nitric acid. Step 1 shows the multilayer stack deposited on substrate 200, with silicon layers 202 and 204 acting as an etch stop, and molybdenum layers 206, 208, and 210 acting as the height definition layers. The first resist layer 212 has been defined in Step 2 and in Step 3, the first patterning step has been accomplished using this layer with the pattern then transferred to the molybdenum layer 206. The next resist layer 214 has also been defined in Step 3. Step 4 shows the subsequent patterning step which involves a two stage etch step. Masked by resist layer 214, the first stage molybdenum layer 208 is patterned using the appropriate etchant, and in the second stage, silicon etch stop layer 204 has been etched through. Finally, in Step 5, molybdenum layer 210 has been etched by virtue of being masked by a resist layer 216. Because of the existence of etch stop layers 202 and 204, the etchant can be used to pattern the height definition layers without concerns about overetching. The material may be exposed for as long as possible to insure complete etching of the feature with fear of etching into the next height definition layer which would compromise the overall process.

Figure 3:
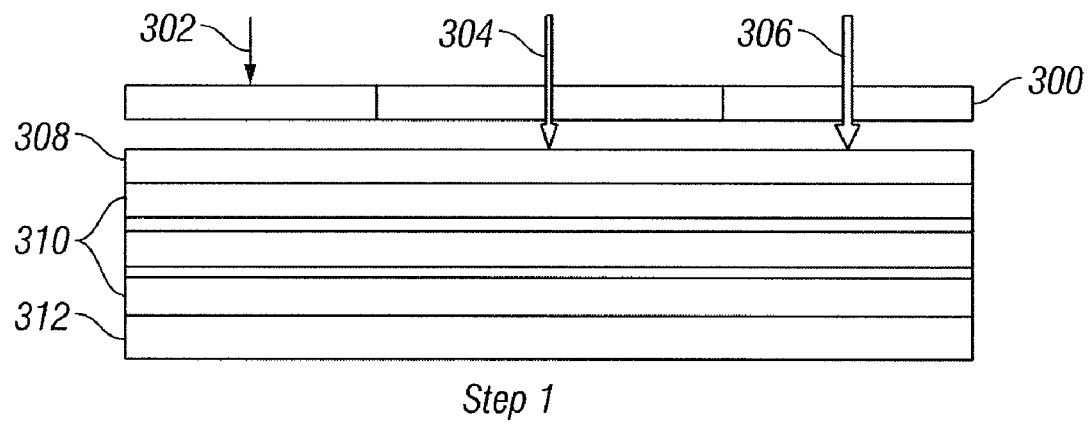
FIG. 3 illustrates a subtractive sacrificial layer sub-process optimized using gray-scale lithography in accordance with another embodiment of the invention.
Figure 3:
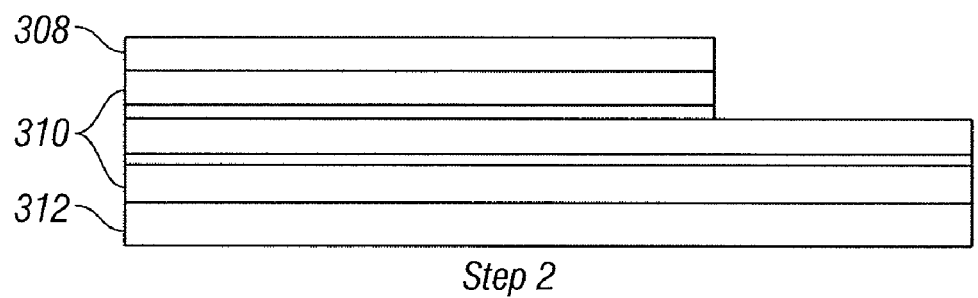
Figure 3:
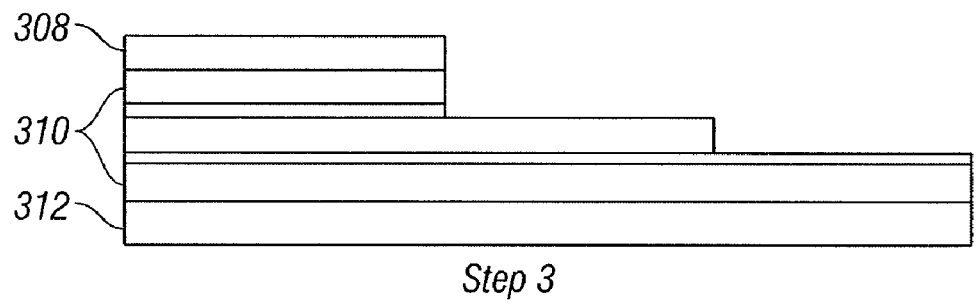

The sub-process of FIG. 2 requires three separate lithography steps. Using gray-scale lithography this may be reduced. FIG. 3 illustrates a variation on this theme which exploits gray-scale lithography to reduce the number of masking steps to one. Referring to FIG. 3 a multilayer etch stack 310 has been deposited on substrate 312 and is identical to the etch stack of FIG. 2. A gray-scale mask 300 which is like a normal lithographic mask except that regions on it may be defined to have variable levels of transmission as opposed to binary levels in traditional masks is positioned over the stack 310. There are numerous ways of preparing such masks as is well known in the art. For this case, three regions have been defined with three different transmission levels shown with zero transmission at a region 302, moderate transmission at a region 304, and the highest at a region 306. In Step 1 when a photoresist layer 308 over the stack 310 is exposed, a well-timed development stage will result in the photoresist below region 306 developing first. The developer stage is a standard part of patterning where photoresist or other photosensitive material, which has been exposed to light, is dissolved away in a chemical solution specially designed for this task. The consequence of the first development stage is that the multilayer etch material under region 306 is exposed. In Step 2 the first etch step is accomplished which defines the first height. In Step 3, after another developer stage, the material under region 304 is exposed and etched appropriately while the region under 306 is etched to the next level. Finally a solvent or other resist removal process is used to finish off the process.

FIGS. 4A-4C, 5A-5B, and 6A-6B illustrate reduced mask fabrication sequences. These sequences differ from the sequence of FIGS. 1A-1F in that they do not contain a black mask, a conductor, or a conductor planarization layer. Certain applications and device designs may eliminate or reduce the need for a black mask. Other applications may not require the addition of a conductor or may have their conductivity sufficiently increased by the presence of a transparent conductor.

Figure 4A:
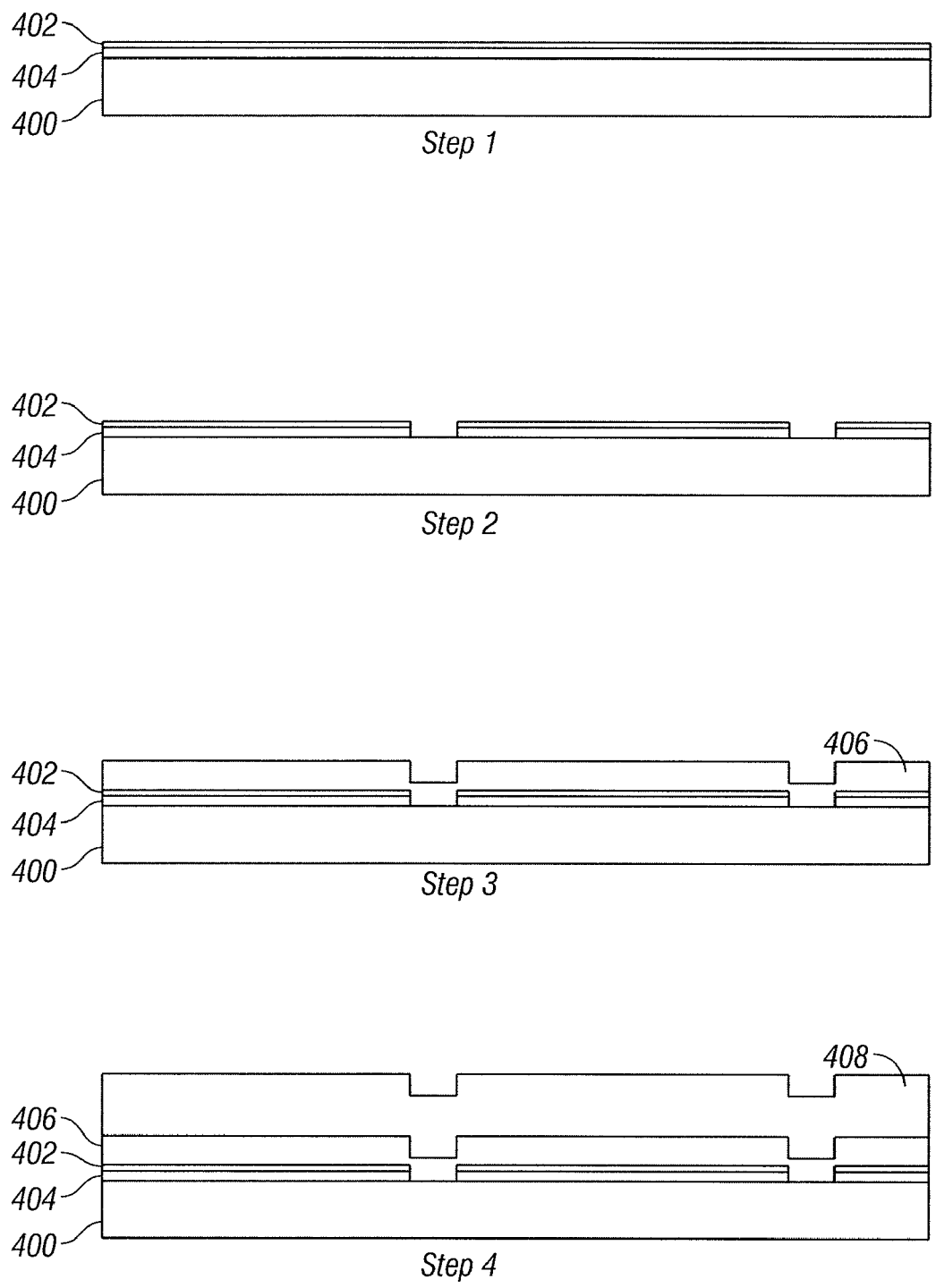
FIGS. 4A-4C illustrate a 4 mask interferometric modulator fabrication process without a black mask or multi-height sacrificial layer in accordance with another embodiment of the invention.
Figure 4B:
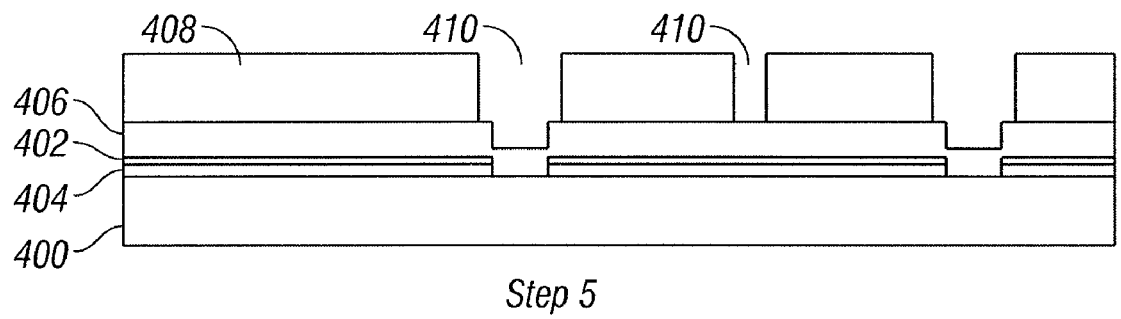
Figure 4B:
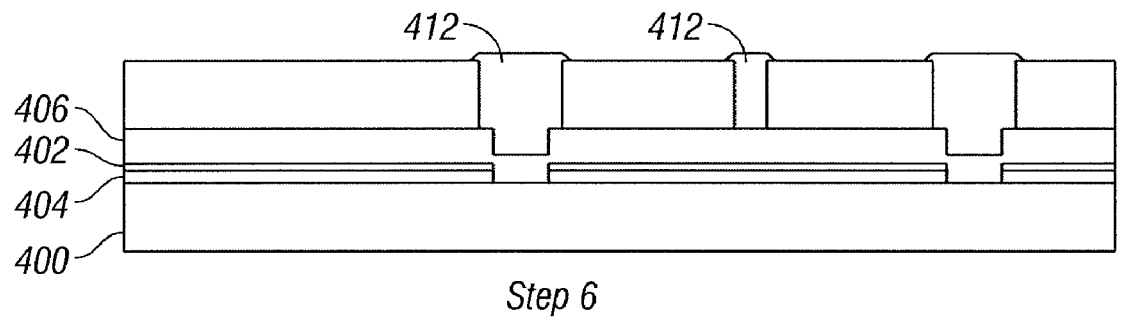
Figure 4B:
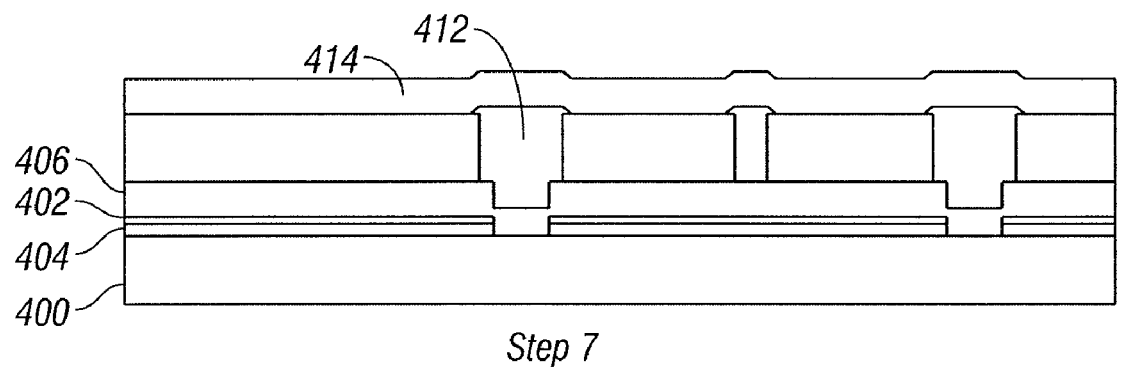
Figure 4C:
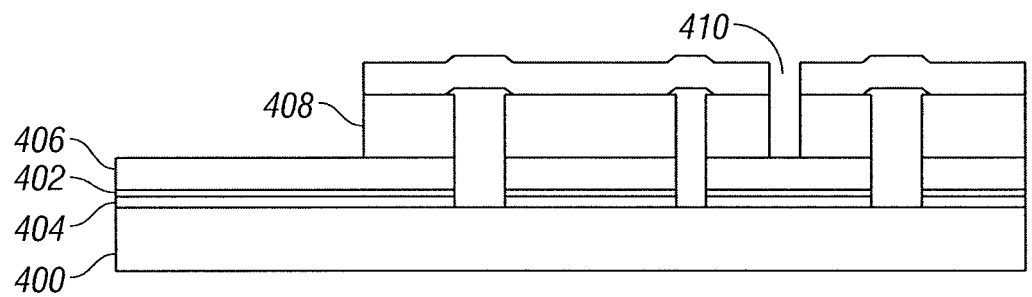
Figure 4C:
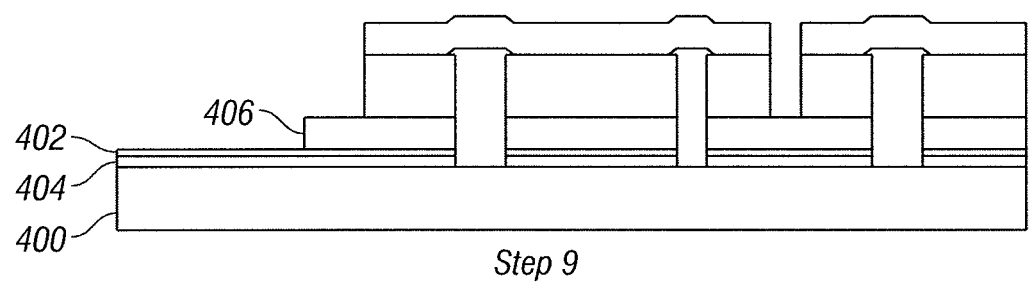
Figure 4C:
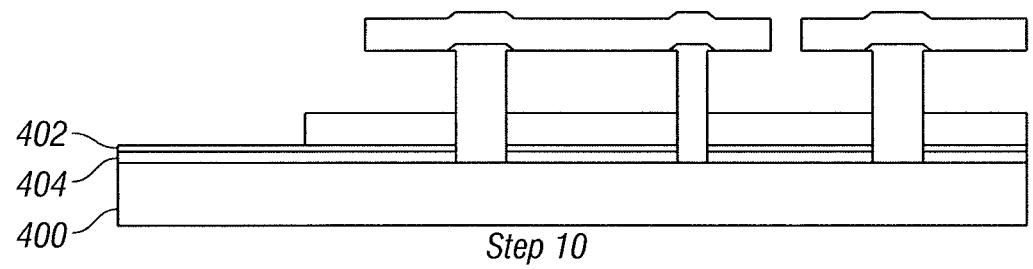

FIGS. 4A-4C illustrate a sequence that uses 4 mask steps. Beginning with Step 1 in FIG. 4A, optical film/s 402 are deposited on a substrate 400. The optical films may or may not include a transparent conductor 404. In Step 2 these films are patterned and in Step 3 an insulating film or films 406 is/are deposited followed by the deposition of a sacrificial material 408 in Step 4. FIG. 4B begins with Step 5 where post support vias 410 have been etched into the sacrificial spacer

408. Spacer posts 412 are formed in Step 6 according to the processes described above, and a mechanical film 414 has been deposited in Step 7.

FIG. 4C starts in Step 8 where sacrificial layer 408 has been etched back, optional etch hole 410 has been formed, and insulator 406 has been etched subsequently in Step 9 to expose optical film 402 for later bonding. The sacrificial layer has been removed in Step 10.

Figure 5A:
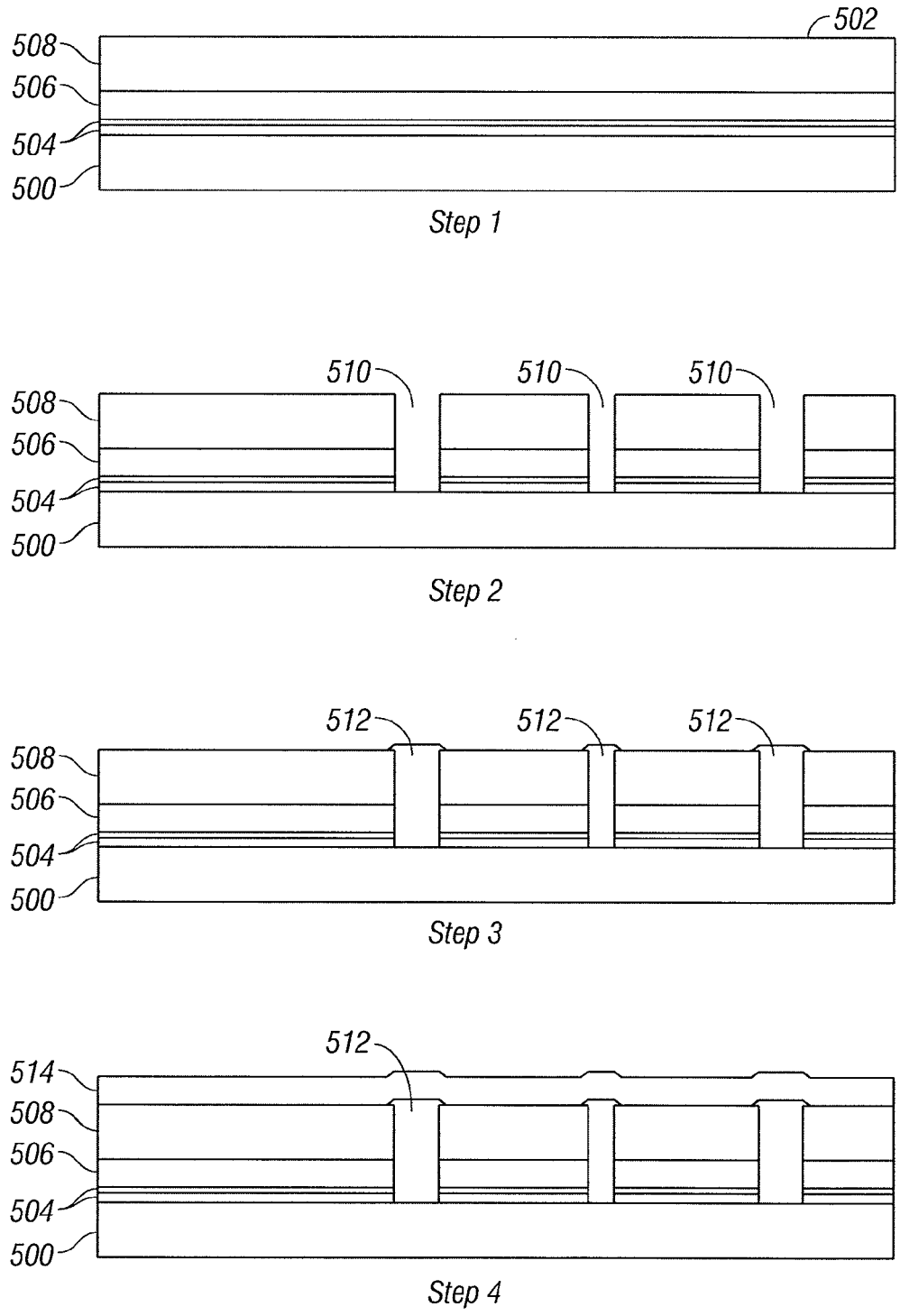
FIGS. 5A-5B illustrate a 3 mask interferometric modulator fabrication process without black mask or multi-height sacrificial layer in accordance with another embodiment of the invention.
Figure 5B:
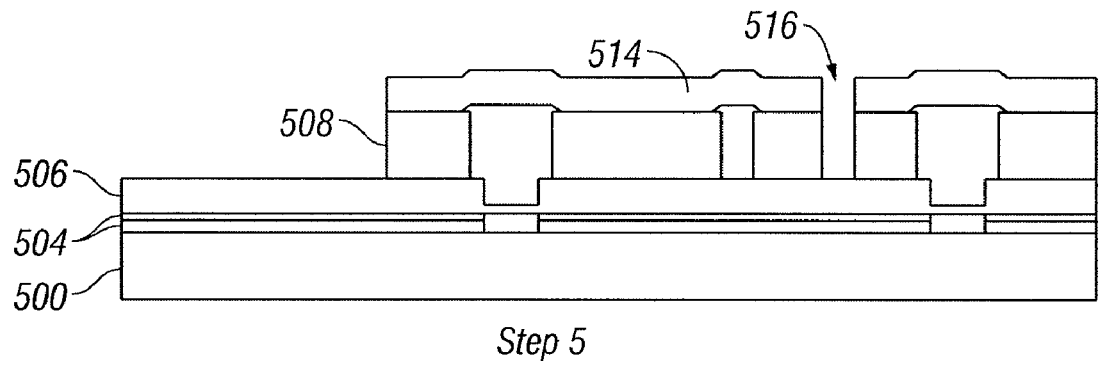
Figure 5B:
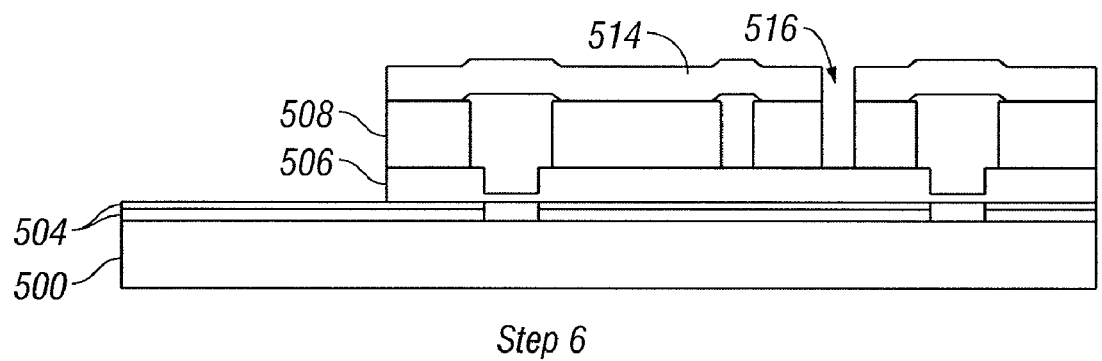
Figure 5B:
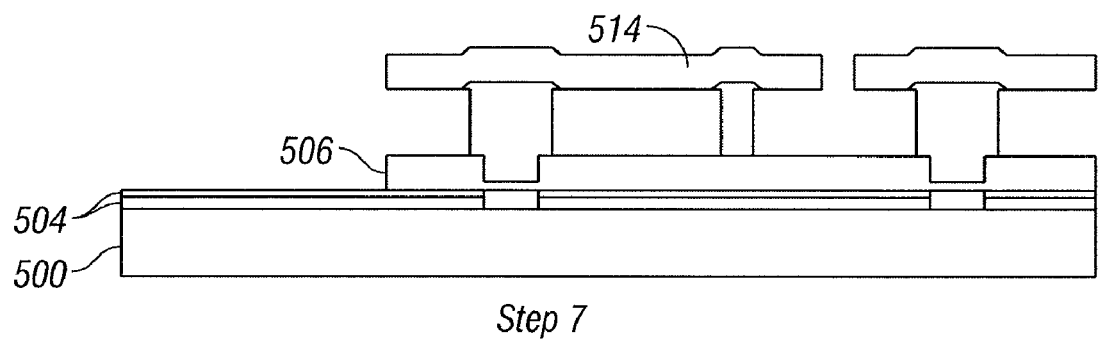

FIGS. 5A-5B illustrate a 3 mask step process. Starting with Step 1 in FIG. 5A a starter stack 502 has been deposited on substrate 500. The starter stack 502 comprises optical/conductor films 504, insulator 506, and a sacrificial layer 508. Step 2 shows the etching of the entire starter stack which constitutes the step consolidation that removes a mask step, and provides support post vias 510. In Step 3, the support posts 512 have been formed and a mechanical film 514 is deposited in Step 4.

FIG. 5B shows in Step 5 the etching of the mechanical film 514, the sacrificial layer 508, and etch hole 516. Step 6 illustrates the etching of the insulator 506. Finally the sacrificial layer is removed using $XeF_2$ in Step 7. Steps 5 and 6 represent the consolidation of a mask step in this sequence since only one mask step is required to accomplish both.

Figure 6:
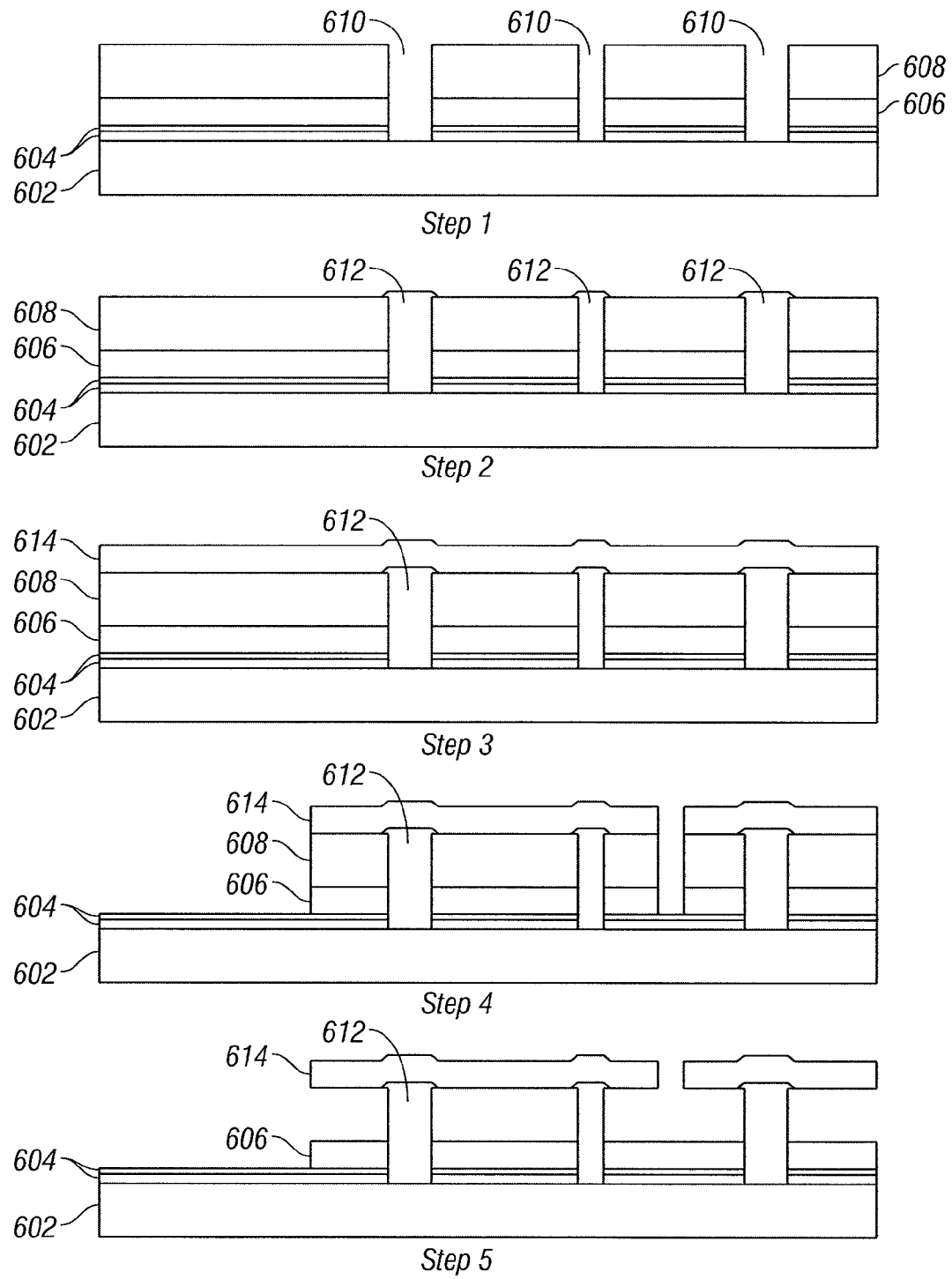
FIG. 6 illustrates a 3 mask interferometric modulator fabrication process without a black mask or multi-height sacrificial layer in accordance with another embodiment of the invention.

FIG. 6A illustrates a 2 mask step process. Referring to FIG. 6A, in Step 1 a starter stack comprising a substrate 602, optical/conductor films 604, an insulator 606, and a spacer 608 is patterned to form support post vias 610. In Step 2, the vias 610 are filled with a support post material 612, and a mechanical film layer 614 is deposited in Step 3. In Step 4, the mechanical layer 614, the spacer 608, and the insulator 606 are etched to expose optical film layers 604 for subsequent bonding. Step 5 is a final step where the sacrificial layer 608 is removed.

Figure 7:
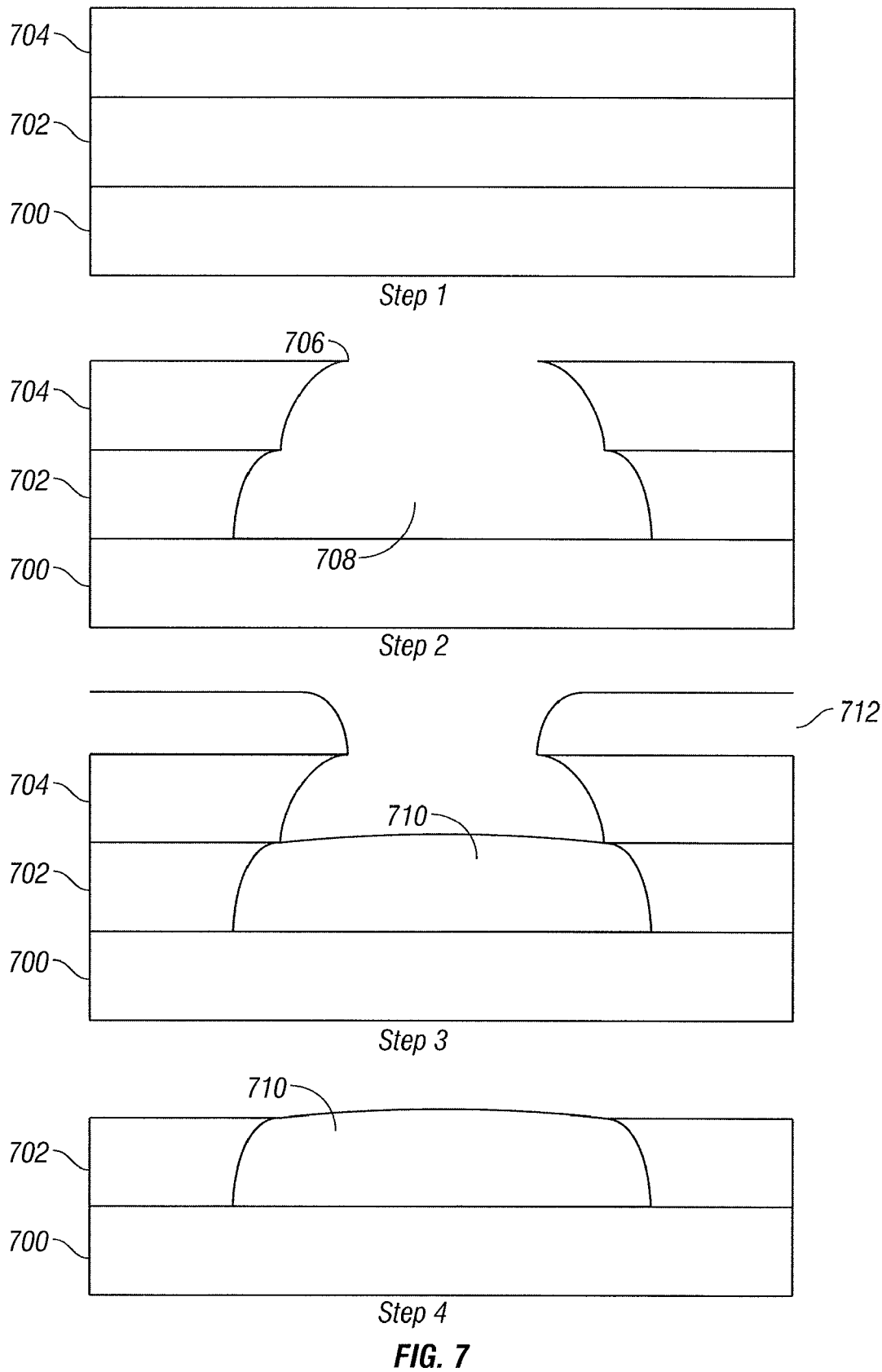
FIG. 7 illustrates a technique for consolidating the formation of post holes and support posts in accordance with another embodiment of the invention.

FIG. 7 illustrates a further means for consolidating mask steps by combining the process for forming the support post vias with the formation of the support posts themselves. This approach relies on a technique which is known in the industry as lift-off. Basically this means that a pattern can be formed in a deposited material not by etching it after deposition, but by forming the pattern during the deposition. One way of achieving this is explained in FIG. 7.

In Step 1 of FIG. 7, a starter stack 702 has been deposited on a substrate 700 and a negative photoresist 704 has been spun on. While positive photoresist may be used, negative resist has the property that a so-called "re-entrant" profile may be formed. A re-entrant profile is one in which the top of the resist is effectively undercut during development. Negative resist differs from positive resist in that exposed negative resist remains during the development process. A mask serves to block light and prevent the exposure of the photoresist 704 below. However diffractive effects actually cause some of the incident light to be redirected underneath the mask. This redirected light produces a "lip" 706 and associated re-entrant profile during Step 2, which shows in the resist 704 after development.

The opening in the resist 704 is used as a mask to define the support post via 708 when it is etched into the starter stack 702. Step 3 illustrates a lift-off process for establishing the support posts which in this case are deposited using some form of physical vapor deposition (PVD) technique as opposed to being spun on and photopolymerized using topside or backside exposure. Because of the reentrant profile, a distinct break is formed between the post material 710 in the hole 708 and the excess post material 712 on the surface of the photoresist 704. Thus in Step 4, the excess material 712 is removed in a lift-off process which uses a liquid solvent to dissolve the remaining photoresist and remove all post material which resides on top of it.

Figure 8:
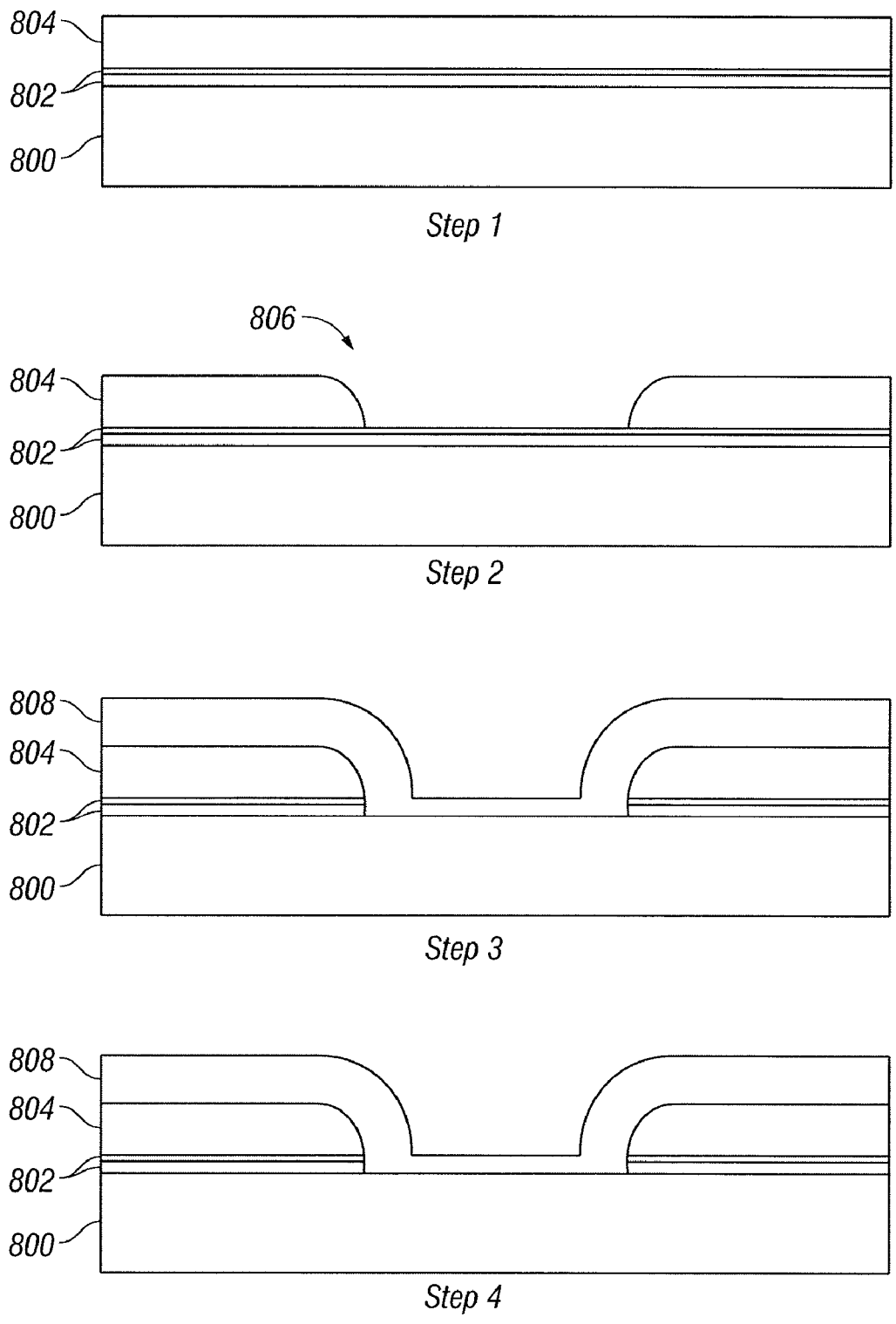
FIG. 8 illustrates an embodiment in which the support posts are eliminated and the mechanical film is self-supporting.
Figure 9A:
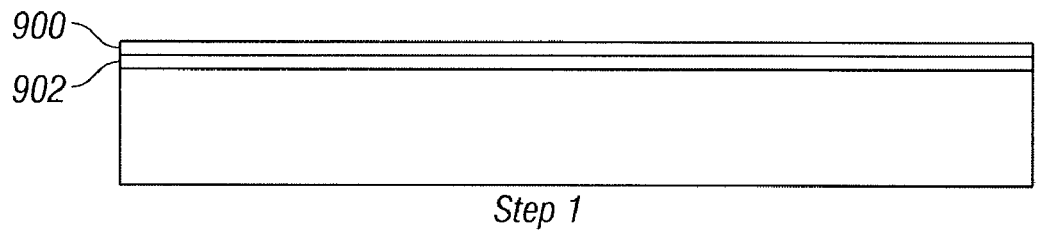
FIGS. 9A-9D illustrate a 6 mask fabrication process for building an interferometric modulator with concealed supports in accordance with another embodiment of the invention.
Figure 9A:
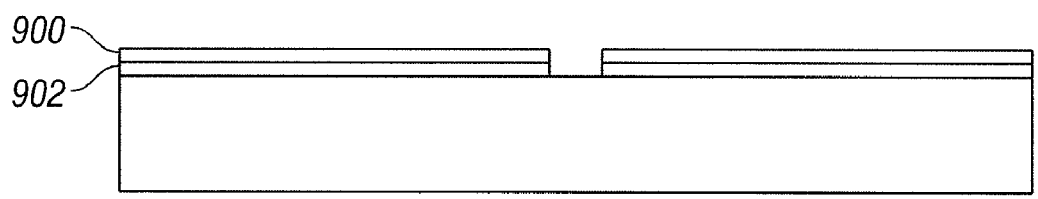
Figure 9A:
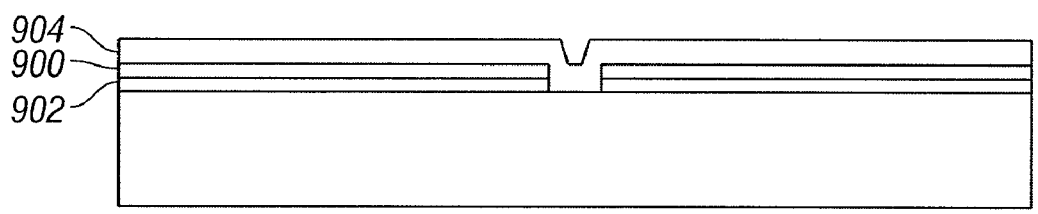
Figure 9A:
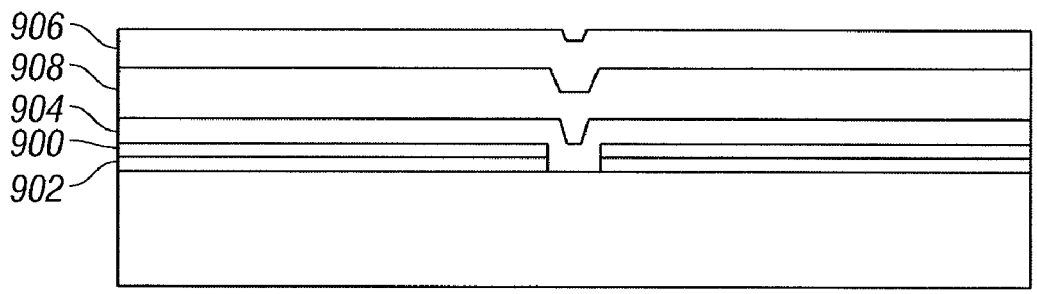
Figure 9B:
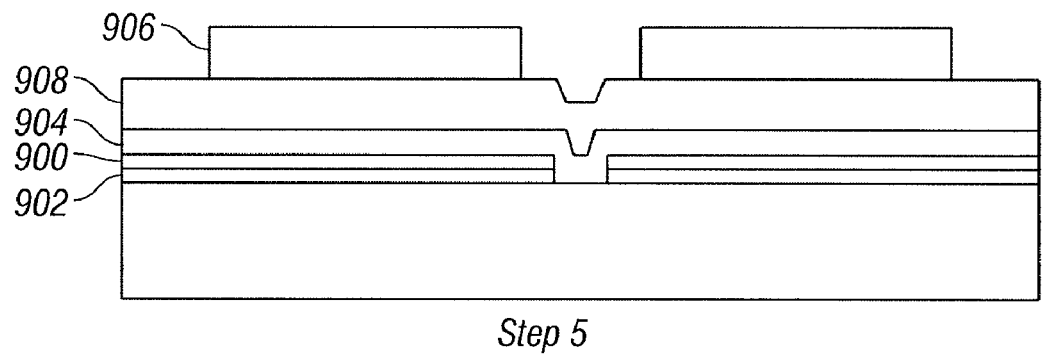
Figure 9B:
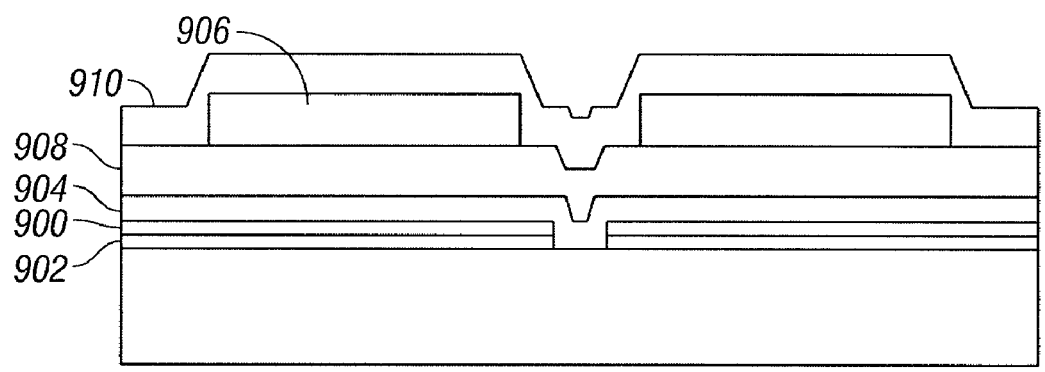
Figure 9B:
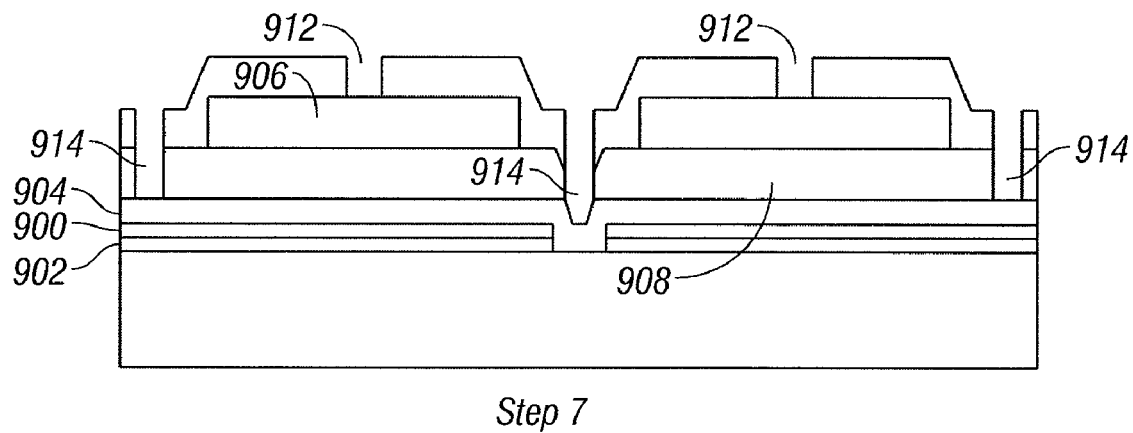
Figure 9C:
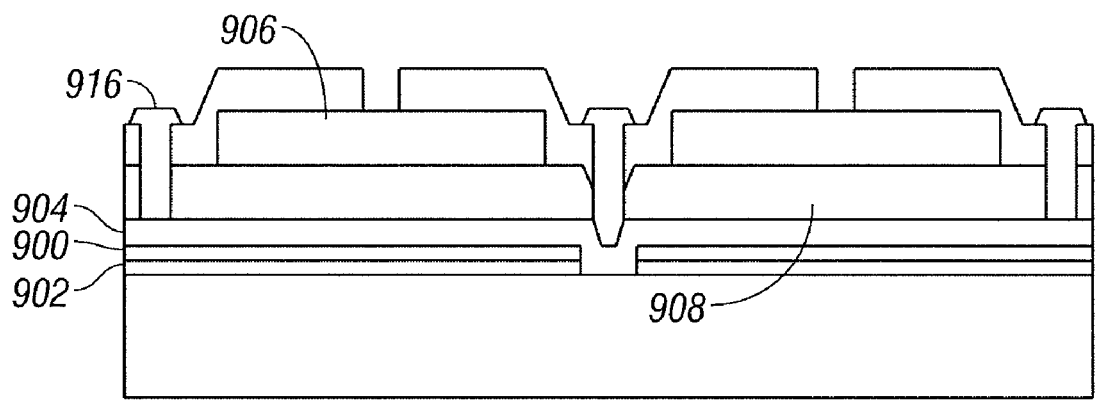
Figure 9C:
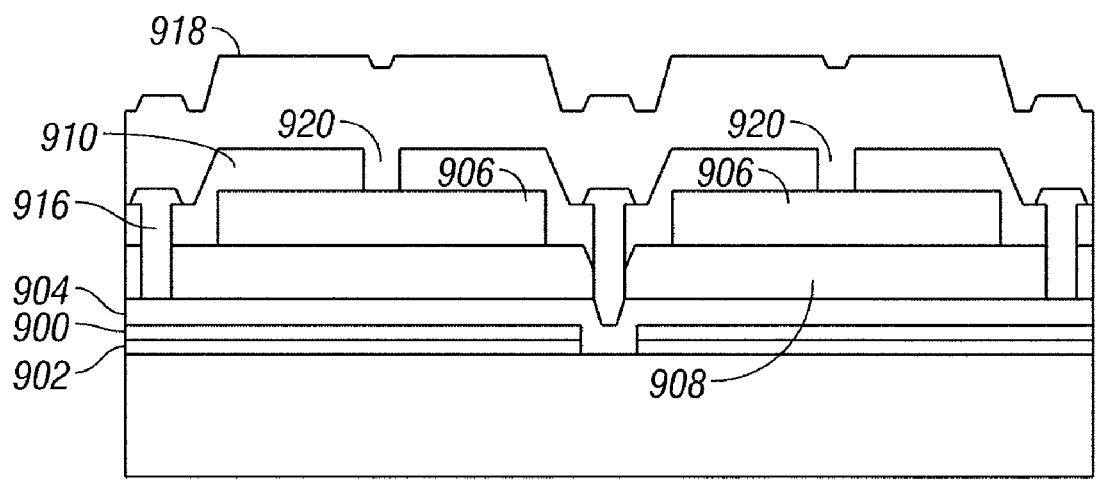
Figure 9D:
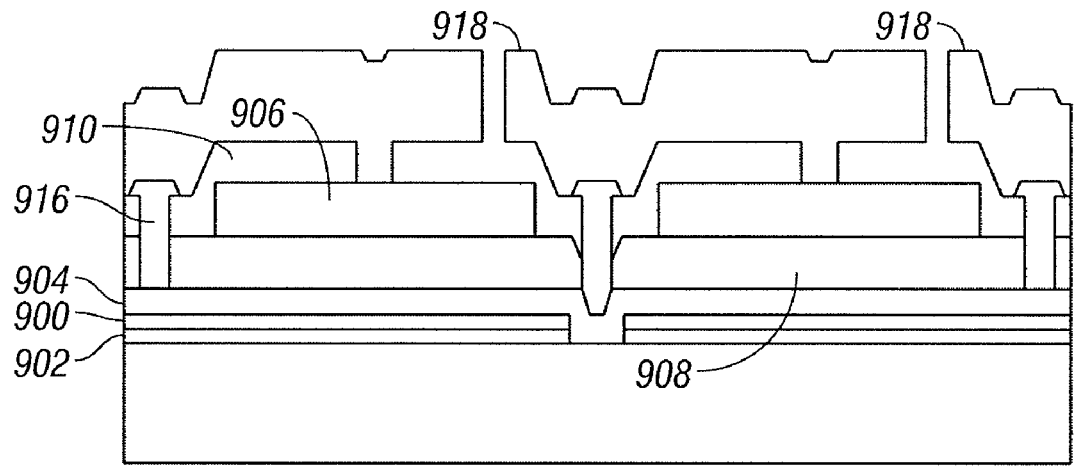
Figure 9D:
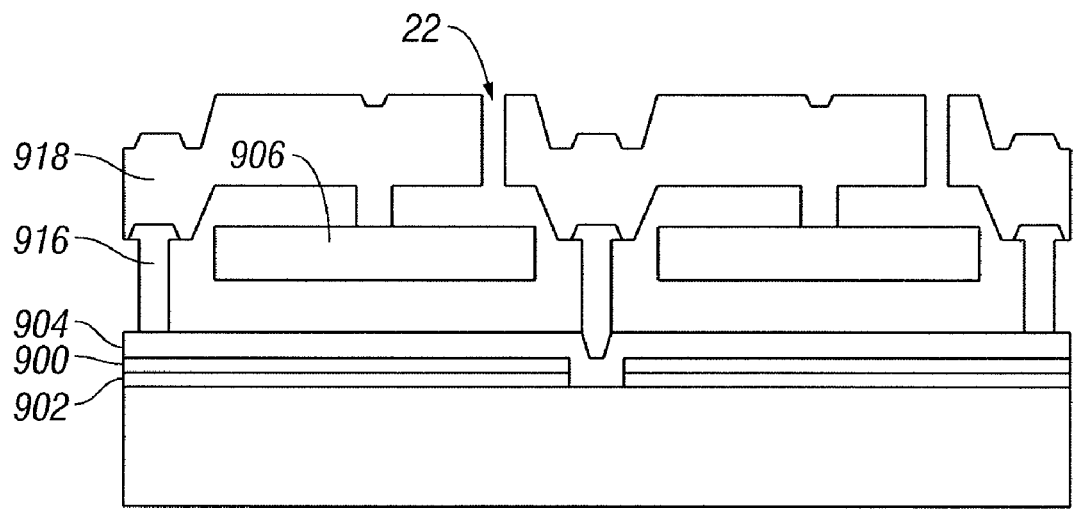

In another embodiment, the fabrication process is further streamlined by the elimination of the support posts. This is shown in FIG. 8 and involves the use of the mechanical film in a self-supporting role. Beginning in Step 1 a starter stack, comprising optical films 802 and sacrificial film 804, is shown deposited on substrate 800. By proper application of etching techniques, a via, 806, is etched onto the stack which exhibits a sloped profile. That is to say, the sidewalls of the via have a profile which is opposite that of the re-entrant profile described in FIG. 7. Because of this, when mechanical film 808 is deposited as in Step 3, the resulting film is conformal and covers the slopes of the via without any break. When the sacrificial film, 804, is removed in step 4, the mechanical film remains standing because it supports itself by being attached to the substrate. This technique may be utilized in all of the process sequences described within this patent application. Advanced interferometric modulator architectures such as those described in patent application Ser. No. 08/769,947 filed on Dec. 19, 1996, now abandoned (a divisional application of which is U.S. Pat. No. 6,680,792 herein incorporated by reference), may also be fabricated using extensions of the previously described process sequences. In this architecture the support structure for the movable mirror is defined separately and positioned in such a way as to be hidden from view. Such a design offers improvements in fill factor, and uniformity in performance.

Referring now to FIG. 9A-9D of the drawings, beginning with Step 1 in FIG. 9, optical films 900 and 902 have been deposited and subsequently patterned in Step 2. Step 3 reveals the deposition of insulator film 904, followed by the deposition of a sacrificial layer, 908, and a mirror material, 906. The mirror is shown after it has been patterned in Step 5, and an additional sacrificial material, 910, has been deposited in Step 6. Step 7 illustrates how the supports and mechanical connections are formed. The patterning which occurs in this step is such that vias 912 etch until stopped by mirror 906, while vias 914 are etched, in the same step, until stopped by insulator film 904 which may be an oxide layer. In this way, and as shown in Step 8, polymer supports 916 are formed using backside exposure techniques to expose the vias 914. Step 9 reveals how a mechanical support layer 918, is deposited and consequently forms a mechanical connection to mirror 906 at the junctions indicated by 920. In Step 10, etch holes 22 are formed, and the entire structure is released in Step 11 using a gas phase etchant.

The fabrication sequences above are meant to illustrate various methods for building interferometric modulator matrices using different mask counts. They are not meant to be limiting in any way in terms of materials used, steps consolidated, or order of steps.

The invention claimed is:

1. A method for fabricating an interferometric modulator by performing subtractive definition of a multi-height sacrificial layer comprising:

depositing a multilayer sacrificial stack on a substrate for the interferometric modulator, wherein the sacrificial stack comprises a first material and a second material, wherein said first and second materials are etchable by a gas etch, and wherein said first material is etchable by a first solution but not a second solution, and wherein the second material is etchable by the second solution but not the first solution;

removing a portion of a first layer of the sacrificial stack comprising the first material by exposing it to the first solution to leave a remaining portion of the first layer;

removing a portion of a second layer of the sacrificial stack comprising the second material by exposing it to the second solution to leave a remaining portion of the second layer; and removing the sacrificial stack including the remaining portions of the first layer and the second layer by exposing it to the gas etch.

2. The method of claim 1, wherein the first material comprises silicon.

3. The method of claim 2, wherein the second material comprises molybdenum.

4. The method of claim 1, wherein the gas etch is $XeF_2$.

5. The method of claim 1, wherein the first solution comprises tetramethylammonium hydroxide.

6. The method of claim 1, wherein the second solution comprises phosphoric acid, acetic acid, or nitric acid.

7. A method for fabricating an interferometric modulator by performing subtractive definition of a multi-height sacrificial layer comprising:

depositing a multilayer sacrificial stack on a substrate for the interferometric modulator, wherein the sacrificial stack comprises:

a first layer comprising a first material, wherein the first material is etchable by a first solution but not a second solution, and a second layer underlying the first layer, the second layer comprising a second material, wherein the second material is etchable by the second solution but not the first solution;

masking a portion of the first layer and second layer with a resist layer;

etching an unmasked portion of the first layer with the first solution to leave a remaining portion of the first layer, leaving exposed a surface of the second layer not protected by the mask; and etching an unmasked portion of the second layer with the second solution to leave a remaining portion of the second layer; and removing the sacrificial stack including the remaining portions of the first layer and the second layer with an etchant.

8. The method of claim 7, wherein the first material comprises silicon.

9. The method of claim 8, wherein the second material comprises molybdenum.

10. The method of claim 7, wherein the etchant is $XeF_2$.

11. The method of claim 7, wherein the first solution comprises tetramethylammonium hydroxide.

12. The method of claim 7, wherein the second solution comprises phosphoric acid, acetic acid, or nitric acid.

13. A method for manufacturing an array of interferometric modulators defining multiple patterns using a single photolithographic step, the method comprising:

depositing a multi-layer sacrificial stack on a substrate, the sacrificial stack comprising etch material;

applying a photoresist layer over the sacrificial stack, the photoresist layer including a first region and a second region;

positioning a gray-scale mask over the sacrificial stack and the photoresist layer, the gray-scale mask having first and second regions of variable levels of transmission over the first and second regions, respectively, of the photoresist layer;

exposing the photoresist through the gray-scale mask;

developing the first region of the photoresist layer by contacting the stack with a developing solution for an interval of time such that the second region of the photoresist layer does not develop, thereby exposing etch material under the first region of the photoresist layer;

removing the developing solution from the stack and etching the etch material under the first region of the photoresist layer to leave a remaining portion of the etch material; and removing the multi-layer sacrificial stack including the remaining portion of the etch material.

14. The method of claim 13, further comprising, after removing the developing solution and before removing the multi-layer sacrificial stack:

contacting the stack with the developing solution for an interval of time until the second region of the photoresist layer develops, thereby exposing etch material under the second region of the photoresist layer; and removing the developing solution from the stack and etching the etch material under the second region of the photoresist layer.

15. The method of claim 14, wherein the multilayer sacrificial stack comprises silicon.

16. The method of claim 15, wherein the multilayer sacrificial stack comprises molybdenum.

* * * * *

UNITED STATES PATENT AND TRADEMARK OFFICE
CERTIFICATE OF CORRECTION

PATENT NO. : 7,723,015 B2
APPLICATION NO. : 11/832471
DATED : May 25, 2010
INVENTOR(S) : Mark W. Miles It is certified that error appears in the above-identified patent and that said Letters Patent is hereby corrected as shown below:

Title Page, item 54, line 2, please change "INTERFEROMETERIC" to --INTERFEROMETRIC-- therefor.

At column 1, line 2, please change "INTERFEROMETERIC" to --INTERFEROMETRIC-- therefor.

At column 1, line 11, please change "2006.The" to --2006. The-- therefor.

At column 3, line 66, please change "$XeF_2$" to --$XeF_2$.-- therefor.

Signed and Sealed this

Twelfth Day of October, 2010

David J. Kappos
*Director of the United States Patent and Trademark Office*